United States Patent [19]

Groby

[11] 4,056,425
[45] Nov. 1, 1977

[54] APPARATUS FOR WELDING TOGETHER A COVER AND A VESSEL OF THERMOPLASTIC MATERIAL

[75] Inventor: Chester Groby, Nol, Sweden

[73] Assignee: Aktiebolaget Tudor, Sundbyberg, Sweden

[21] Appl. No.: 713,899

[22] Filed: Aug. 12, 1976

[30] Foreign Application Priority Data

Aug. 15, 1975 Sweden .............................. 75/09150

[51] Int. Cl.² ............................................ B32B 31/04
[52] U.S. Cl. .................................... 156/499; 156/69; 156/306; 429/153
[58] Field of Search ......................... 228/58; 136/175; 156/69, 499, 304, 306; 429/153

[56] References Cited

U.S. PATENT DOCUMENTS

| | | | |
|---|---|---|---|
| 2,387,566 | 10/1945 | Custers | 156/499 |
| 2,681,097 | 6/1954 | Gray | 156/69 |
| 3,013,925 | 12/1961 | Larsen | 156/304 |

Primary Examiner—Edward G. Whitby
Attorney, Agent, or Firm—Burns, Doane, Swecker & Mathis

[57] ABSTRACT

Apparatus for welding together a cover and a vessel formed of thermoplastic material comprises a pair of heating cheeks. Each heating cheek has two arms disposed in essentially L-shaped arrangement. The cheeks are adapted to be disposed between the cover and vessel to heat the respective edges thereof. The cheeks are mounted for movement in separate directions from between the cover and vessel without passing across the opening of the vessel. Therefore, the time required to remove the welding apparatus from between the cover and vessel is reduced, and there need be no concern for hitting elements projecting upwards from the vessel.

5 Claims, 2 Drawing Figures

APPARATUS FOR WELDING TOGETHER A COVER AND A VESSEL OF THERMOPLASTIC MATERIAL

BACKGROUND AND OBJECTS

The present invention concerns a device for welding together a cover and a vessel of thermoplastic material. The invention concerns a tool for so-called hot plate welding or mirror welding, i.e., a process wherein the surfaces that are to be joined are heated to a molten state and thereafter brought together, suitably under controlled pressure, so that a bond is attained between the two parts. The tool according to the invention is especially suited for use when the vessel or cover presents elements or protrusions that extend up above or down below the respective edges, so that a welding tool that is flat and covers the whole surface cannot be used. It is anticipated that the tool will find its primary application in the welding of the cover onto a vessel for cells of electric storage batteries.

Hot tool welding is a method that is much utilized for joining vessels and covers of thermoplastic material when the wall thicknesses are about 1 mm or more. Automatic machines are available for execution of this welding operation. The tool, i.e., the heating plate from which heat is transferred to the surfaces that are to be joined, consists in these machines of a flat plate with the same configuration as the surfaces or edges that are to be joined. Such machines have also been used for the fastening of covers on battery vessels. In certain types of batteries there are connecting elements in the electrical system that stick up beyond the vessel edge. The welding tool is then given recesses that correspond to these elements. In welding together covers and vessels, these elements and recesses are first brought into a specific position with reference to each other, at a suitable spaced distance, so that the welding tool can be introduced between them. The vessel and cover are then applied against the tool which, as a rule, is managed by holding the cover stationary and bringing the welding tool up against it. Thereafter the vessel is brought up against the underside of the welding tool. When a sufficient amount of heat has been transferred, the vessel is lowered and then the tool, whereafter the tool is withdrawn, i.e., it executes a motion that corresponds at least to the width of the narrowest vessel wall. The vessel is then moved upward so that it is applied against the cover and is pressed against it with a specific pressure, for a specific period of time to effect the bonding.

There are a number of drawbacks associated with this known method. A substantial disadvantage is that the welding tool is substantially bigger than the edge surfaces that are to be heated. Hereby there are unnecessary heat losses, and because the tool covers the whole surface of the vessel, the recesses mentioned above have to be made in the tool, to accommodate any elements that extend upward from the vessel. Moreover, the welding tool has to execute a motion in two directions, one of which motions is relatively long, i.e., removing the tool from between the cover and vessel. This has the effect that the time elapsing between the breaking of contact between the tool and the edges of the vessel and cover and the pressing of these surfaces against each other as described above can amount to about 2 seconds. During this time, there is a certain cooling off of the heated thermoplastic material which can have a negative effect on the welding and on the properties of the obtained weld. It would therefore be highly valuable if this time could be reduced. Another disadvantage of the known methods is that there has to be a special welding tool for each configuration of the surfaces that are to be welded. This entails extra labor and time expenditure in switching between various types of vessels and covers.

BRIEF DESCRIPTION

The present invention concerns a device whereby the above-mentioned disadvantages are eliminated. The device according to the invention thus yields use of welding tools of a substantially lesser heated mass, more rapid joining operations and greater flexibility in selecting the size of objects that are to be joined.

A device for welding a cover and vessel of thermoplastic material according to the invention is characterized in that the welding tool comprises two movably disposed, substantially L-shaped heating cheeks, each presenting two arms. Since the tool covers only the edges that are to be heated and leaves the opening of the vessel otherwise free, i.e., uncovered, a substantial reduction in the weight and volume of the welding tool is obtained. The arms of one cheek of the welding tool are movably disposed with reference to the arms of the other cheek. Thereby, the tool can be divided when it is to be removed from between the heated edges, and taken away by two shorter, opposed motions. The time required for removing the welding tool after conclusion of the heating is thus very short. The two heating cheeks are adapted to the configuration of the objects to be joined, and since this configuration generally is rectangular, the heating cheeks are primarily L-shaped. The invention is not limited to such a shape of the heating cheeks, however, but the essential fact is that it is adapted to the form of the objects to be joined. In the following discussion however, the description of the preferred form of the invention is based on heating cheeks with two arms that form an L, with a 90° angle between the arms. The movement, to take the heating cheeks from the position they assume in heating the weld edges, should thus suitably be directed at an angle of 45° with reference to the arms. Thus, there is created the shortest possible movement for the heating cheeks. The heating cheeks must therefore be fixed on what are here designated as guide rails, which must form an angle of about 45° with reference to the arms. The device must also include means for holding the vessel and the cover, at least one of which must be movable in a right angle against the plane of the welding tool.

The device is especially suitable for the joining of the cover and vessel in the manufacture of products in a series of different sizes with standardized dimensions. An example of such a product is certain kinds of cells for electric storage batteries. The size of these cells is determined by the size of the electrodes therein. The width of these electrodes is the same in a great number of cells of various types, and cells with different capacitances are obtained by incorporation in the cells of electrodes of different length and a different number of electrodes. Since the measurement of the surface to be covered by the cell cover depends partly upon the width of the electrodes and partly upon the number of electrodes, there is the result that the rectangular opening of the vessel for a great number of types of cells has the same length but varies in width. A device according to the invention can be simply changed over for use on different widths because the heating cheeks are movably arranged with reference to each other, in a direction parallel to an arm on each respective heating cheek. If thereby the short side of one arm on one heating cheek is applied against the inner long side of the other arm on the other heating cheek, adjustment is simple, e.g., by shifting the fastening of either of the heating cheeks.

THE DRAWINGS

A preferred embodiment of the invention will now be described in more detail in conjunction with the accompanying drawing wherein.

DETAILED DESCRIPTION

Figure 1:
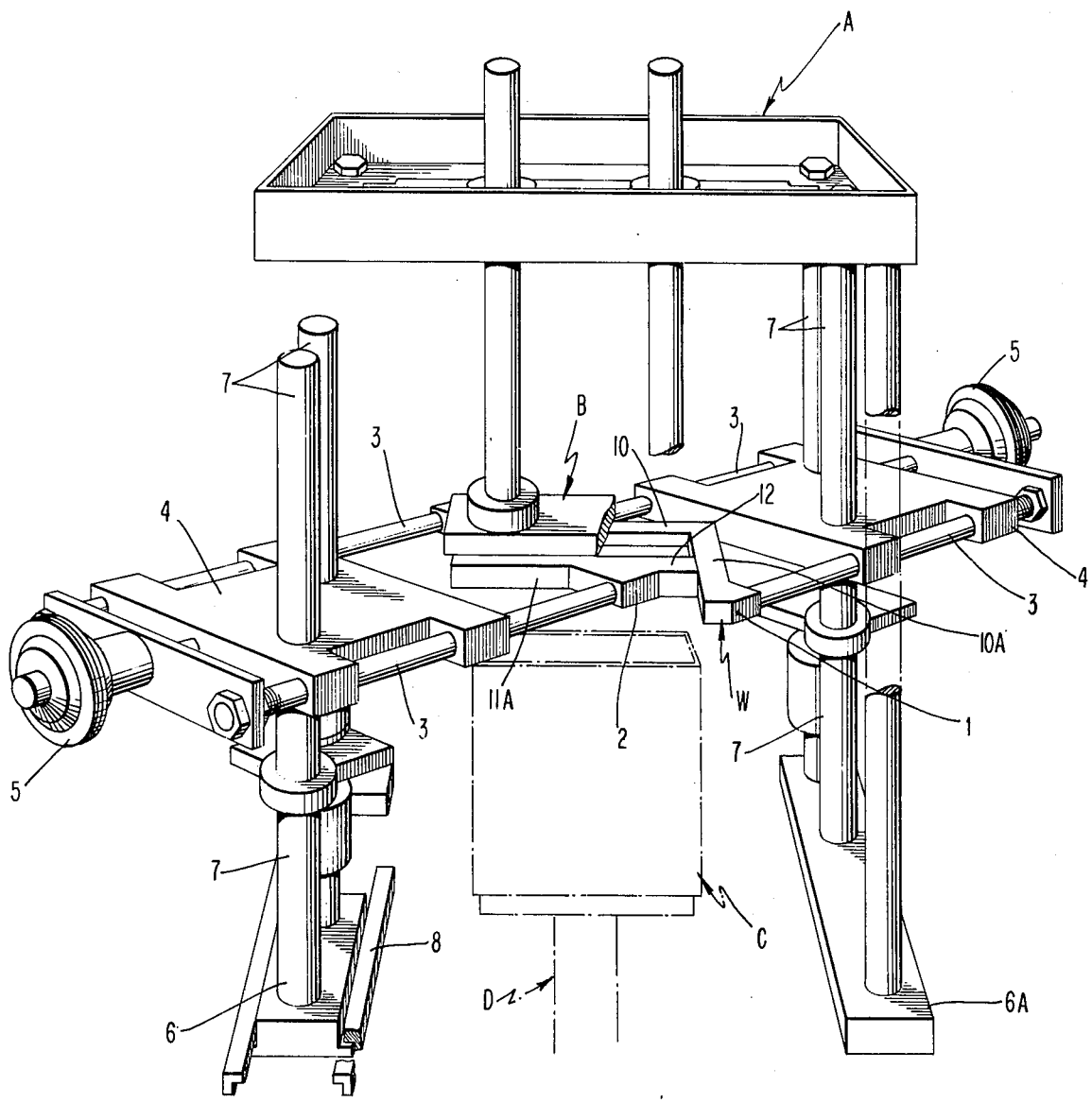
FIG. 1 shows a device according to the invention in perspective.
Figure 2:
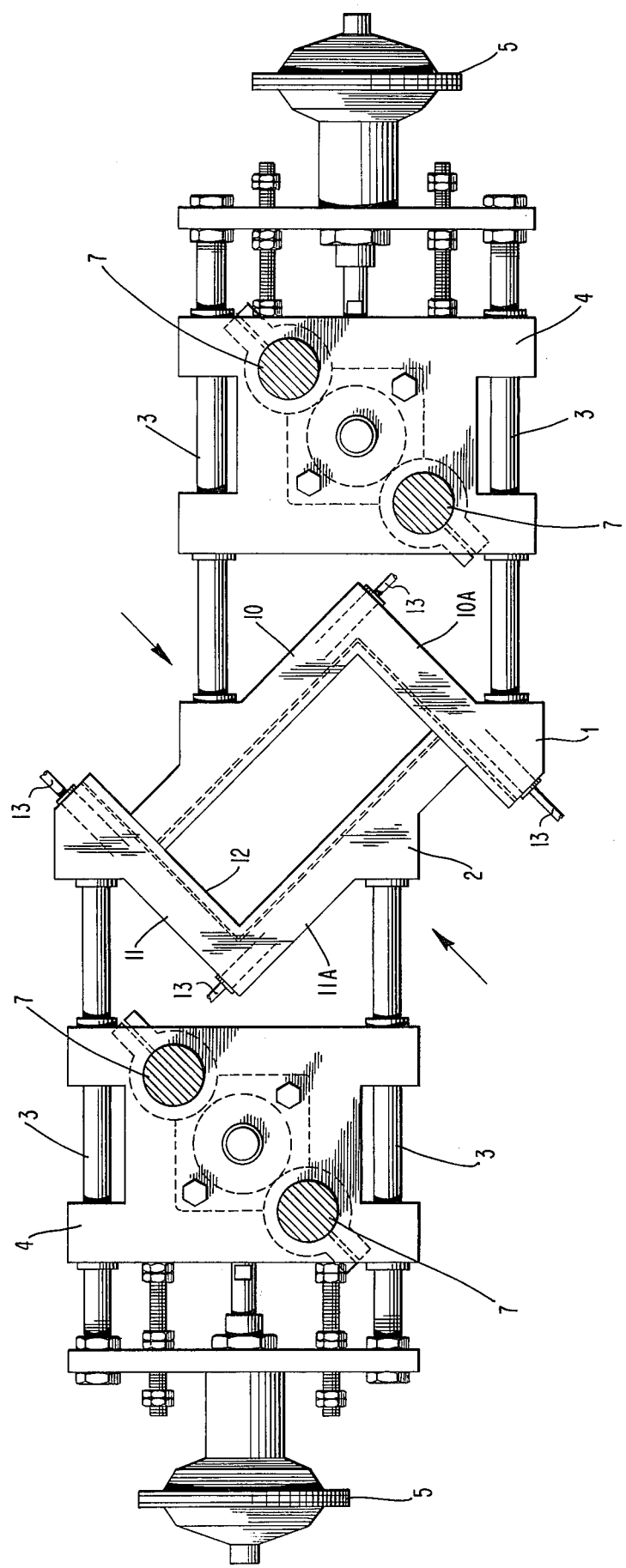
FIG. 2 shows the welding tool of this device, as well as the parts for fixing the tool which allow movement in a 45° angle with reference to the arms of the heating cheeks.

In FIG. 1 there is partly drawn a holding device A for holding the cover B that is to be welded, and a device D for supporting the vessel C. On the other hand, the position of a vessel before it is brought up against the heating cheeks is indicated by dashed lines. The welding tool W comprises two L-shaped heating cheeks 1 and 2 having L-shaped arms 10, 10A and 11, 11A (FIG. 2). These cheeks are fixed on guide rails 3 which are movably fastened in holders 4. Movement is effected by means of hydraulic or pneumatic cylinders 5. Holders 4 are fixed on a frame having a bottom part 6, 6A and a column 7. The holders may suitably be movable vertically along the column. The bottom part 6 can be moved in tracks 8 in a direction parallel to arms 11, 10A to adjust one dimension of the welding tool. Also, the track 8 can be mounted in another track (not shown) to enable the bottom part 6 to be moved parallel to the arms 10, 11A so that the other dimension of the welding tool can be adjusted. The heating cheeks are so disposed that the end of one arm 10 on one cheek 1 is applied against the inner side 12 of the other arm 11 on the other heating cheek 2. Likewise, the end of arm 11A is to be applied against the inner side of arm 10A.

In operation, the bottom part 6 is suitably positioned so that the welding cheeks 1, 2, when brought together by the rams 5, are coplanar and assume a configuration corresponding to that of the edges of the cover and vessel being joined. With the cover B in position, the welding tool W is then raised along columns 7 into engagement with the edge of the cover. Then the vessel is raised into contact with the tool by elevational support means D. The cheeks are heated via electric conduits 13. The welding tool then heats the edges of the cover and the vessel to the proper temperature. Thereupon, the vessel is lowered from contact with the tool and the tool is lowered from contact with the cover. By actuating the rams 5, the cheeks, 1, 2 are separated, and then the vessel is raised into contact with the cover. This is achieved in a very short time, thereby guarding against excessive cooling of the cover and vessel edges. Since the tool need not pass across the opening of the vessel, there need be no concern for elements projecting upwardly therefrom or downwardly from the cover. Moreover, less energy is required to heat the tool since it is of less mass.

Although the invention has been describe in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. Apparatus for welding together a cover and a vessel of thermoplastic material, said apparatus comprising a pair of heating cheeks adapted to be disposed between the cover and the vessel to heat edges thereof to be joined, said heating cheeks being mounted for movement in separate directions from between the cover and the vessel without passing across the opening of the vessel, each heating cheek comprising a pair of arms disposed in mutually angled relationship; the end of an arm of one heating cheek being applied against the inner side of an arm of the other heating cheek.

2. Apparatus according to claim 1 including first means for supporting a vessel and second means for supporting a cover, one of said first and second supporting means being movable in a direction perpendicular to the angle of the welding tool.

3. Apparatus for welding together a cover and a vessel of thermoplastic material, said apparatus comprising a pair of heating cheeks adapted to be disposed between the cover and the vessel to heat edges thereof to be joined, said heating cheeks being mounted for movement in separate directions from between the cover and the vessel without passing across the opening of the vessel, each heating cheek comprising a pair of arms disposed in L-shaped arrangement; a pair of guide rails movably supporting respective ones of said heating cheeks for movement in a direction arranged at an angle of about 45° relative to each arm.

4. Apparatus for welding together a cover and a vessel of thermoplastic material, said apparatus comprising a pair of heating cheeks adapted to be disposed between the cover and the vessel to heat edges thereof to be joined, said heating cheeks being mounted for movement in separate directions from between the cover and the vessel without passing across the opening of the vessel; each heating cheek comprising a pair of arms disposed in mutually angled relationship; guide means supporting said heating cheeks for movement, said guide means being adjustably movable in a direction parallel to at least one of the dimensions formed by said heating cheeks, to vary the size of that dimension.

5. Apparatus for welding together a cover and a vessel of thermoplastic material, said apparatus comprising a pair of heating cheeks adapted to be disposed between the cover and the vessel to heat edges thereof to be joined, said heating cheeks being mounted for movement in separate directions from between the cover and the vessel without passing across the opening of the vessel; each heating cheek comprising a pair of arms disposed in mutually angled relationship; the end of a first of said arms of one heating cheek is applied against the inner side of a first of said arms of the other heating cheek, and the end of a second of said arms of said other heating cheek being applied against the inner side of a second of said arms of said one heating cheek; said one heating cheek being movable in a direction parallel to one of the arms of said other heating cheek.

* * * * *